Figure 1:
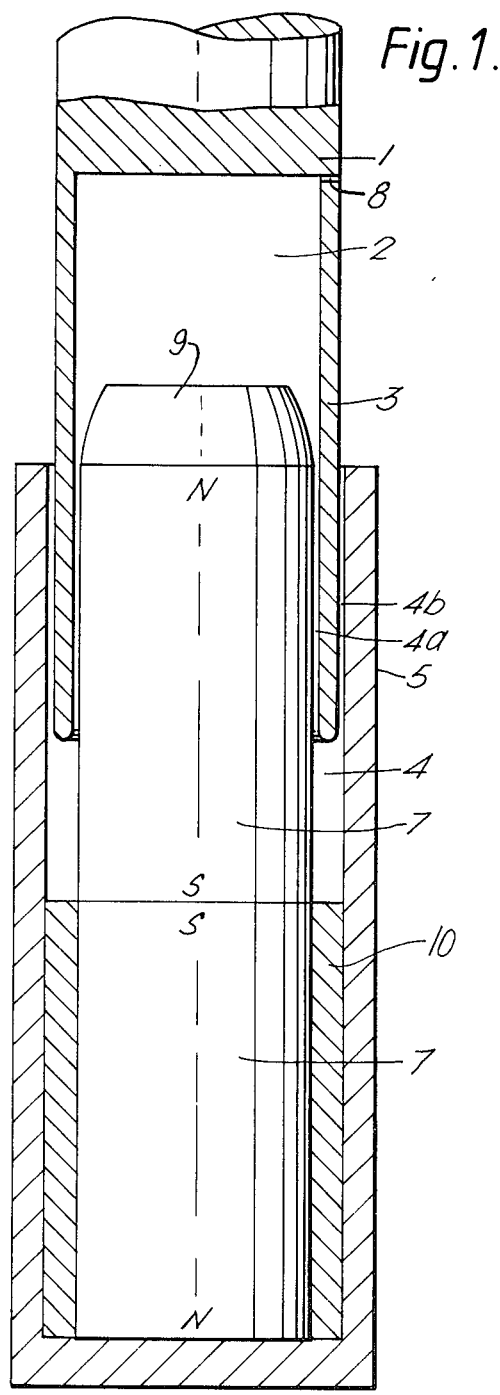

United States Patent [19]

Thatcher et al.

[11] Patent Number: 4,487,739
[45] Date of Patent: Dec. 11, 1984

[54] HYDRAULIC SHOCK ABSORBERS

[75] Inventors: Gordon Thatcher, Lymm; Daniel F. Davidson, Altrincham, both of England

[73] Assignee: United Kingdom Atomic Energy Authority, London, England

[21] Appl. No.: 208,024

[22] Filed: Nov. 18, 1980

[30] Foreign Application Priority Data

Nov. 21, 1979 [GB] United Kingdom ............... 7940308

[51] Int. Cl.³ ............................................. G21C 7/20
[52] U.S. Cl. ..................................... 376/234; 188/267
[58] Field of Search ............... 188/267; 376/228, 229, 376/234, 242, 243

[56] References Cited

U.S. PATENT DOCUMENTS

| 2,792,565 | 5/1957 | Popowsky | 188/267 |
| 4,024,018 | 5/1977 | Barnes | 376/234 |
| 4,104,118 | 8/1978 | Housman | 376/234 |

FOREIGN PATENT DOCUMENTS

| 935831 | 12/1955 | Fed. Rep. of Germany | 188/267 |
| 756107 | 8/1956 | United Kingdom | 188/267 |

OTHER PUBLICATIONS

"The Standard Handbook for Electrical Engineers", Fink and Beaty, 11 ed., McGraw Hill, N.Y., pp. 10.14–10.15.

Primary Examiner—Richard E. Schafer
Assistant Examiner—Daniel Wasil
Attorney, Agent, or Firm—Larson and Taylor

[57] ABSTRACT

A hydraulic shock absorber of the dash pot kind for use with electrically conducting liquid such as sodium, has magnet means for electro magnetically braking a stream of liquid discharged from the cylinder. The shock absorber finds use in a liquid metal cooled nuclear reactor for arresting control rods.

4 Claims, 2 Drawing Figures

HYDRAULIC SHOCK ABSORBERS

This invention relates to hydraulic shock absorbers of the dash pot kind.

Hydraulic shock absorbers of the dash pot kind are devices having a plunger and cylinder combination wherein energy is absorbed by the displacement of fluid by the plunger through a restricted passageway. British Pat. No. 1,444,238 discloses a typical use of a hydraulic shock absorber of the dash pot kind in a nuclear reactor construction, the shock absorber being provided for arresting free fall of a nuclear fuel sub-assembly. It is proposed to include hydraulic shock absorbers of this kind in a liquid metal cooled nuclear reactor construction for arresting shut-off rods, that is, for arresting rods of neutron absorbing material which are thrust into the reactor fuel assembly in an emergency to effect an immediate power shut off. The clearance between plunger and cylinder constitutes a restricted passageway but unfortunately in conventional shock absorbers the required clearance is insufficient to accommodate deformation of the structure such as that caused by radiation induced swelling.

It is an object of the invention to provide a hydraulic shock absorber of the dash pot kind for arresting a shut-off rod in a liquid metal cooled nuclear reactor.

According to the invention a hydraulic shock absorber of the dash pot kind incorporates a magnetohydrodynamic brake arranged so that displacement of electrically conductive liquid produces pressure gradients electromagnetically along the displacement path of the fluid thereby creating a force opposed to the displacement.

In a preferred construction of hydraulic shock absorber according to the invention the plunger of a plunger and cylinder combination for the displacement of electrically conductive liquid is of cup shape and the wall of the cup is received in an annular void presented by the cylinder whereby displacement of liquid from inside the cup is successively through the co-axial annular ducts bounded by the cylinder and wall of the cup, the cylinder housing a pair of cylindrical permanent magnets arranged end-to-end with like poles adjoining. The adjoining like poles of the magnets produce increased flux density so that the electrohydro-dynamic damping force progressively increases with displacement of the plunger towards the adjoining poles. The preferred hydraulic shock absorber provides relatively high hydraulic damping at the commencement of fluid displacement and relatively high magnetohydrodynamic damping at the termination of displacement the latter damping effect increasing progressively as the former damping decreases so that deceleration of the plunger tends towards constancy during displacement of fluid.

The invention finds application in a liquid metal cooled nuclear reactor having neutron absorber rods which can be thrust into the fuel assembly to effect immediate power shut off, shock absorbers being arranged to absorb energy by the displacement of coolant in bringing the rods to rest in the fuel assembly.

By supplementing the hydraulic damping with magnetohydrodynamic damping the clearances between plunger and cylinder of the shock absorber can be made large enough to accommodate deformation of the structure caused by radiation induced swelling and the combination also tends towards a desirable constant deceleration of the shut off rod.

Figure 2:
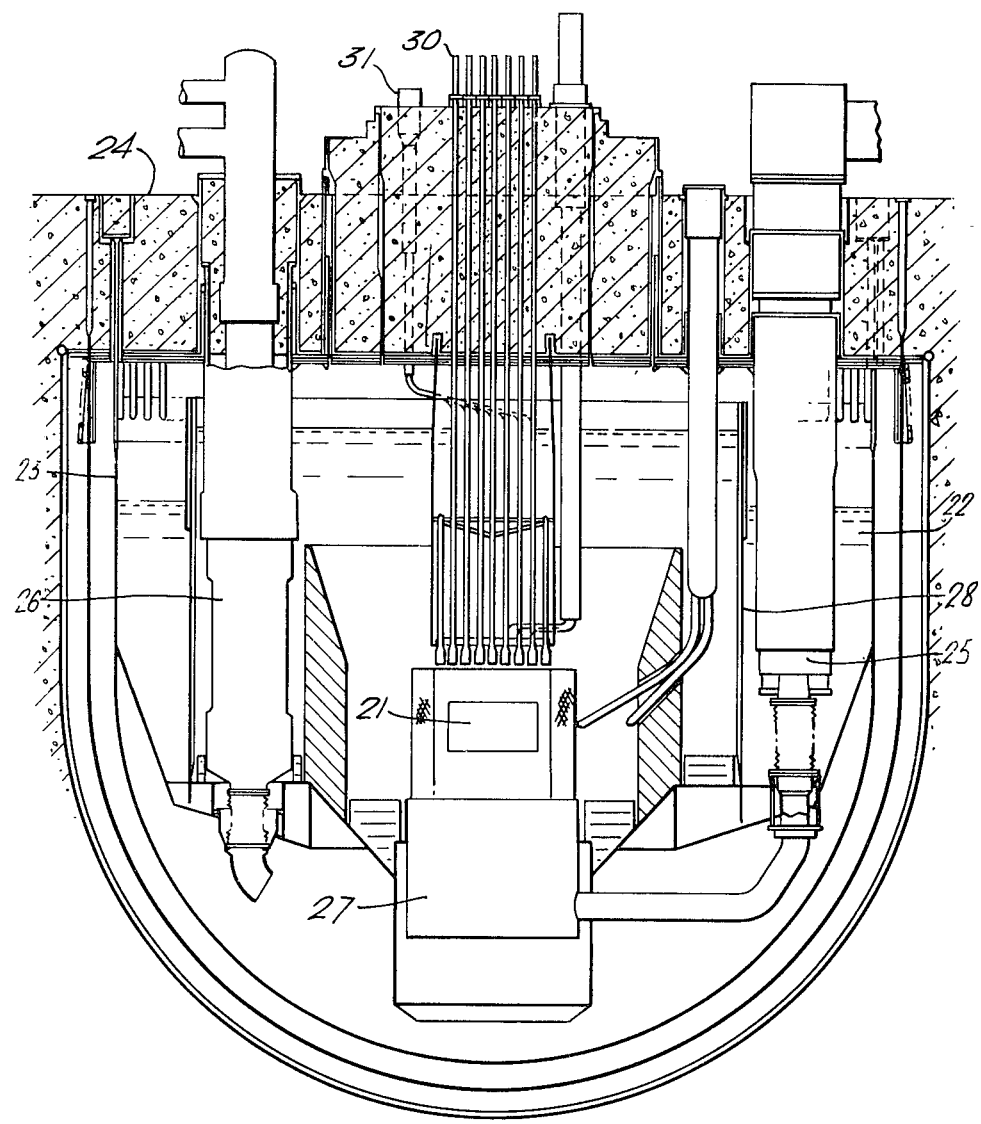

A hydraulic shock absorber according to the invention and a nuclear reactor embodying the invention are described by way of example with reference to the accompanying diagrammatic drawings wherein, FIG. 1 is a cross-sectional view of the shock absorber, and FIG. 2 is a cross-sectional view of a liquid metal cooled nuclear reactor.

The hydraulic shock absorber shown in FIG. 1 comprises a vertical plunger 1 of stainless steel having an inverted cup shape 2 at its lower end. The wall 3 of the cup is received in an annular void 4 presented by a cylinder 5 having a closed lower end. The cylinder is of ferritic steel and contains a pair of cylindrical magnets 7 arranged vertically end-to-end with like poles adjoining. The annular void 4 is bounded by the cylinder and cylindrical magnets. The cup shape end of the plunger has a vent aperture 8, the leading end 9 of the pair of magnets is formed to provide an entry guide for the plunger and a sleeve 10 is provided to locate the magnets.

In use the shock absorber is submerged in an electrically conductive fluid so that when the plunger 1 is urged downwardly into the annular void 4 by a falling load, for example, fluid is displaced from inside the cup 2 and successively through restricted passageways formed by the co-axial annular ducts 4a, 4b bounded by the walls of the cup, cylinder and pair of magnets.

Energy is absorbed by displacement of the fluid through the restricted passageways thereby decelerating the plunger and load. Flow of fluid through the field of magnetic flux generated by the magnets generates circulatory electric currents in the fluid in a plane normal to the direction of fluid flow and the currents in turn induce an opposing force to the flow of fluid. As the flux density increases towards the end of travel the magnetohydrodynamic effect progressively increases so that retardation of the plunger and load is effected by hydraulic damping in combination with magnetohydrodynamic damping, the former decreasing with progressive displacement of the plunger and load and the latter increasing with progressive displacement. This manner of deceleration of the plunger tends towards constant deceleration.

The nuclear reactor construction shown in FIG. 2 comprises a fuel assembly 21 submerged in a pool 22 of liquid sodium coolant in the primary vessel 23. The primary vessel is suspended from the roof of a containment vault 24 and there is provided a plurality of coolant pumps 25 and heat exchangers 26 only one of each of the pumps and heat exchangers being shown. The fuel assembly 21 mounted on a support structure 27 is housed with the heat exchangers in a core tank 28 whilst the pumps 25, which deliver coolant to the support structure 27, are disposed outside of the core tank. Control rods 30 and instrumentation 31 penetrate the roof of the vault.

In operation of the nuclear reactor, relatively cool coolant drawn from the region of the pool outside of the core tank 28 by the pumps 25 is passed upwardly through the fuel assembly 21 in heat exchange therewith by way of the support structure 27, thence through the heat exchangers 26 to be discharged back into the outer region of the pool. A secondary coolant is flowed from outside the vault through the heat exchangers 26 in heat exchange with the pool coolant thence to steam generation plant not shown in the drawings. The control rods 30 comprise neutron absorbing material some of them being variably insertable into the fuel assembly to maintain a steady state of reactivity whilst others, termed shut-off rods and normally held out of the fuel assembly, are rapidly insertable to effect an immediate power shut off in an emergency. Hydraulic shock absorbers according to the invention are provided to absorb the shock of the shut off rods when rapidly brought to rest in the fuel assembly. The cylinders of the shock absorbers are located below the fuel assembly 21 within the pool of coolant and the plungers are constituted by the lower ends of the shut off rods. The hydraulic shock absorbers are particularly suited to these nuclear reactor duties because the clearances between the plunger and the walls of the annular void can be made adequate to accommodate deformation of the structure caused by radiation induced swelling.

We claim:

1. A liquid metal cooled nuclear reactor including a vessel containing a pool of electrically conducting liquid metal coolant, at least one nuclear fuel assembly submerged in the pool of liquid coolant, a neutron absorber rod releasably suspended above a fuel assembly, a shock absorber disposed in the liquid coolant and of the liquid displacement dash pot kind and including a magneto-hydrodynamic brake comprising means for generating an electromagnetic force for producing pressure gradients electromagnetically along the displacement path of the liquid coolant to create a force opposed to the liquid coolant displacement, the shock absorber being arranged for receiving the absorber rod when released from its suspension and comprising a cylinder for containing liquid metal coolant from said pool, a plunger longitudinally movable within the cylinder and engageable by the absorber rod during its fall, the plunger defining a first passage between it and the cylinder for liquid coolant displaced from the cylinder by insertion of the plunger, permanent magnet means co-axially disposed with the cylinder so as to extend parallel to the first passage, and means locating the permanent magnet means within the cylinder, the plunger having a cup-shaped end within which one end of the permanent magnet means is locatable to define therebetween a second passage for the displaced liquid coolant whereby the permanent magnet means generates a magnetic flux field across the first passage and the second passage, so that in operation there is a maximum hydraulic damping at the commencement of the liquid coolant displacement and maximum magneto-hydrodynamic damping at the termination of the displacement, the latter damping effect increasing progressively as the former damping effect decreases so that deceleration of the plunger and hence of the absorber rod tends towards constancy during displacement of the liquid coolant through the first passage and the second passage.

2. A nuclear reactor according to claim 1, wherein said permanent magnet means comprises a pair of permanent magnets in the cylinder and arranged end-to-end with like poles adjoining.

3. A nuclear reactor means as claimed in claim 2, wherein the permanent magnet means is formed at said one end to guide entry of the permanent magnet means into the cup-shaped end.

4. A nuclear reactor as claimed in claim 1, wherein the plunger defines a vent aperture through the cup-shaped end thereof for the venting of liquid coolant displaced through the second passage into the cup-shaped end.

* * * * *